United States Patent [19]

Lange et al.

[11] Patent Number: 4,491,167

[45] Date of Patent: Jan. 1, 1985

[54] DEVICE FOR THE TRANSPORT OF BAR-SHAPED WORKPIECES, PARTICULARLY SEWING MACHINE NEEDLE BLANKS

[75] Inventors: Horst Lange, Aachen, Fed. Rep. of Germany; Klaus Pavel, Eynatten, Belgium

[73] Assignee: Rhein-Nadel Maschinennadel GmbH, Aachen, Fed. Rep. of Germany

[21] Appl. No.: 424,669

[22] Filed: Sep. 27, 1982

[30] Foreign Application Priority Data

Jan. 29, 1982 [DE] Fed. Rep. of Germany ......... 302920

[51] Int. Cl.³ .............................................. B21G 1/00
[52] U.S. Cl. .................................... 163/1; 10/162 R; 198/625; 198/676
[58] Field of Search ............... 198/676, 625, 608, 663; 72/405; 163/1, 4; 10/162 R

[56] References Cited

U.S. PATENT DOCUMENTS

| | | | |
|---|---|---|---|
| 1,565,849 | 12/1925 | Durand, Jr. | 198/625 X |
| 1,953,257 | 4/1934 | Peirce | 10/162 R |
| 2,259,748 | 10/1941 | Hullhorst | 198/676 X |
| 2,906,238 | 9/1959 | Heaton et al. | 198/625 X |
| 4,068,450 | 1/1978 | Easter | 198/676 X |

FOREIGN PATENT DOCUMENTS 258354  9/1926  United Kingdom ................... 163/1

Primary Examiner—Mark Rosenbaum
Attorney, Agent, or Firm—Martin A. Farber

[57] ABSTRACT

A device for transporting bar-shaped workpieces, particularly blanks for sewing machine needles, between the stop positions of a follow-on tool, includes one or more transport spindles extending over the length of the follow-on tool and having a threaded section arranged for form-locked engagement with the workpiece, the threaded section being interrupted by a lead-less section in the region of a predetermined stop position, the lead-less section extending over an angle corresponding to a predetermined stop time.

7 Claims, 10 Drawing Figures

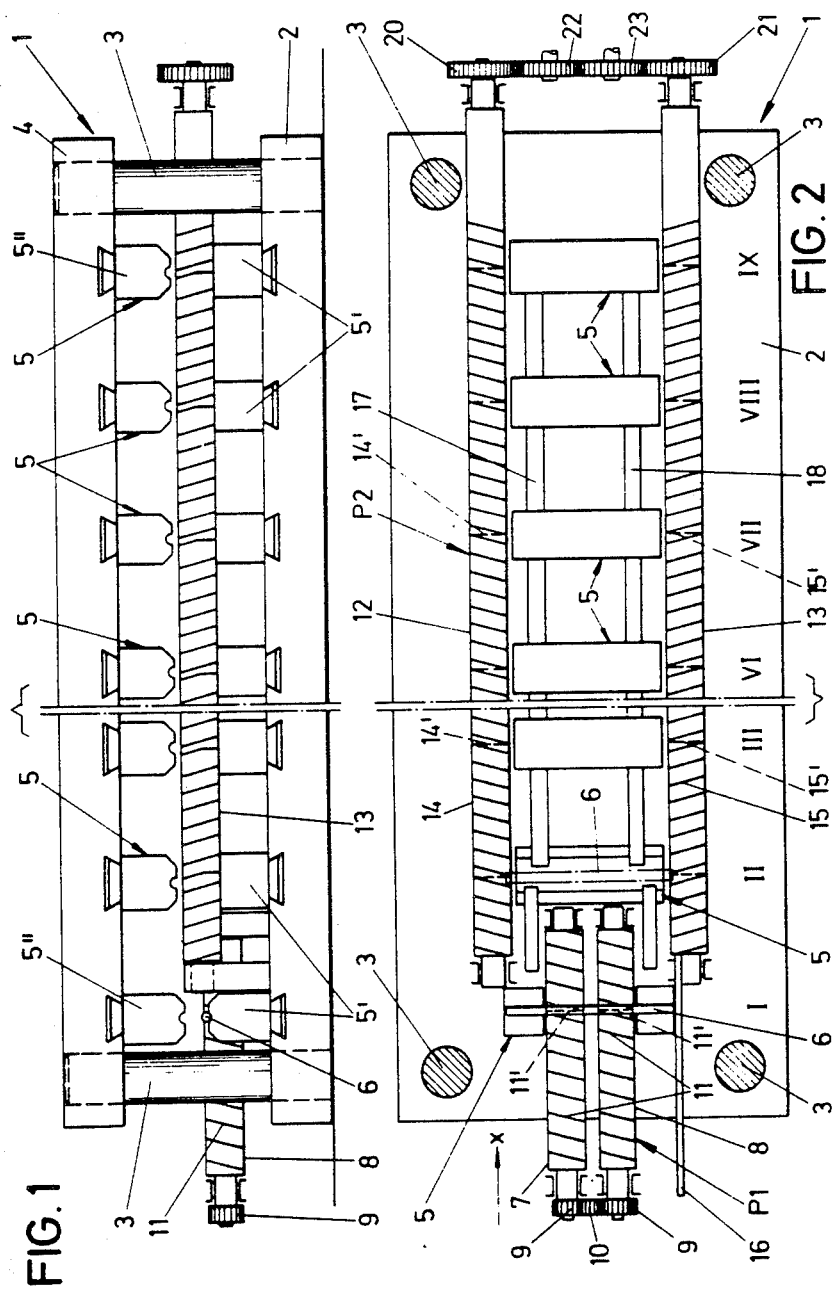

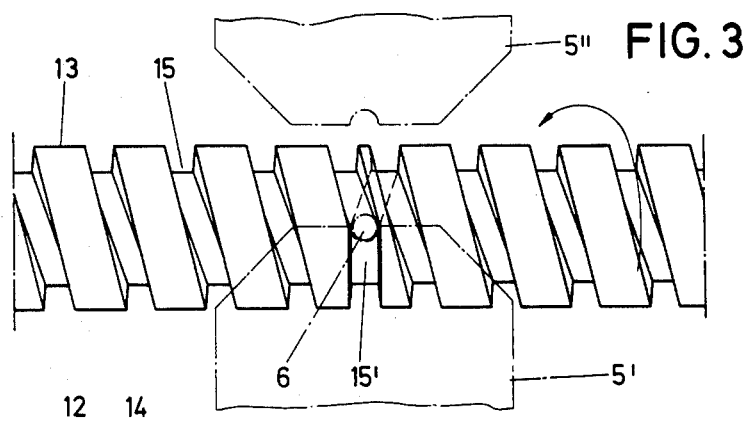
FIG. 3
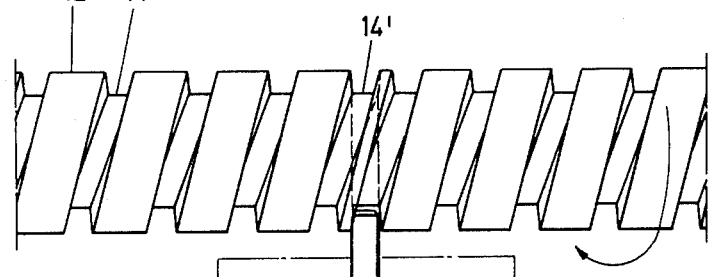
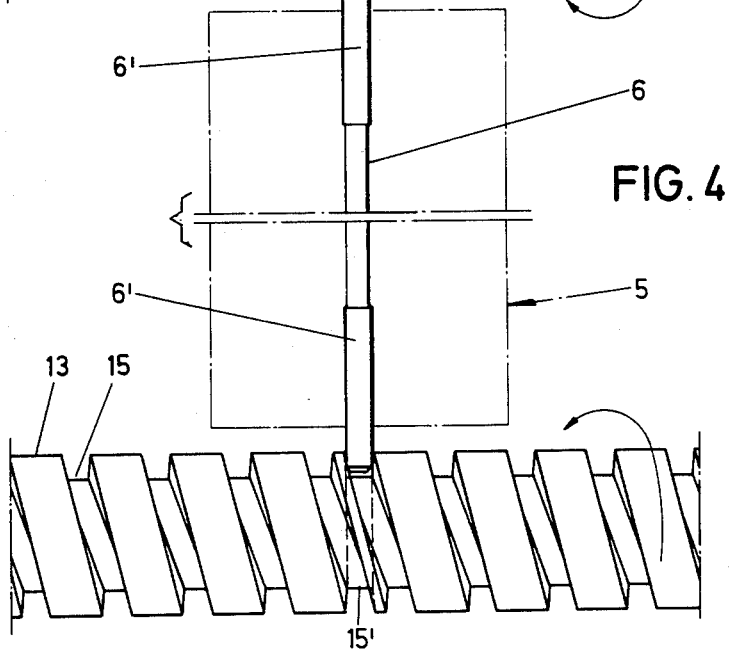
FIG. 4

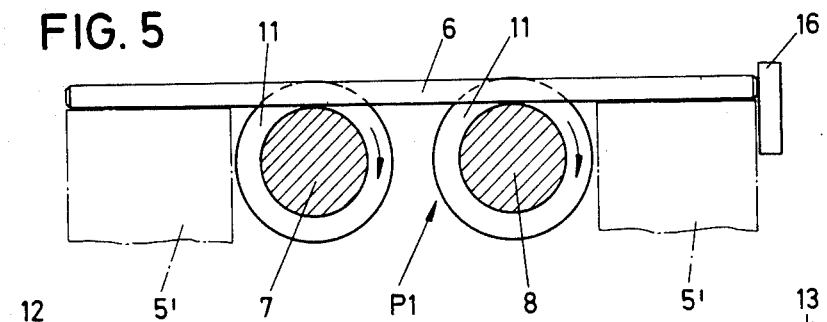
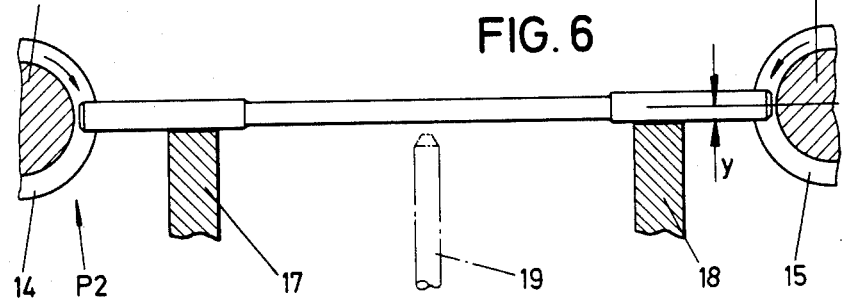
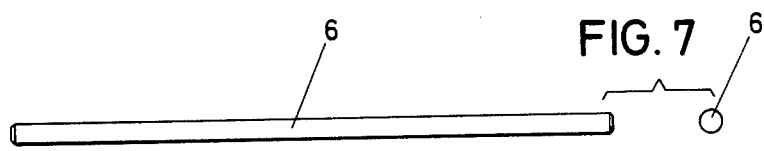
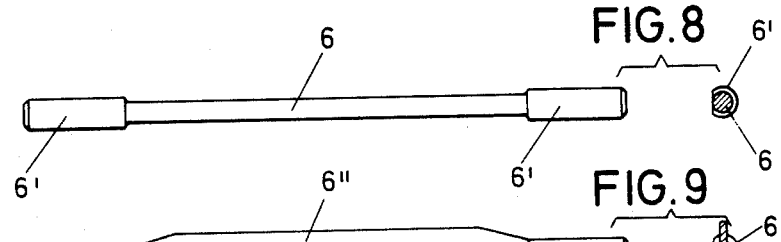
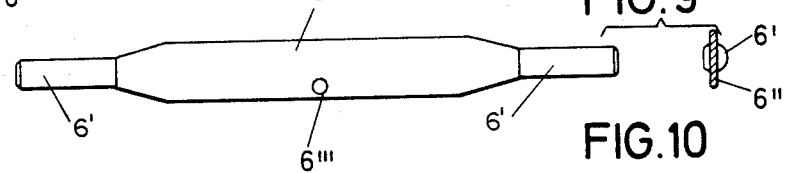
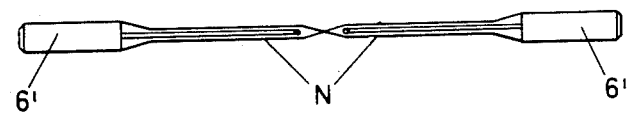

DEVICE FOR THE TRANSPORT OF BAR-SHAPED WORKPIECES, PARTICULARLY SEWING MACHINE NEEDLE BLANKS

The present invention relates to a device for the transport of bar-shaped workpieces particularly blanks for sewing machine needles, between the stop positions of a follow-up tool.

It is known in the case of follow-up tools to stop the transport device when the bar-shaped workpieces reach their stop positions. Such developments are expensive and provide limited output.

The object of the present invention is to develop a device of the aforementioned type in a manner simple to manufacture in such a way that the device does not have to interrupt its transport movement, thus obtaining increased output.

This object is achieved by one or more transport spindles (7, 8, 12, 13) extending over the length of the follow-on tool and having a threaded section arranged for form-locked engagement with the workpiece, said threaded section being interrupted by a lead-less section (11', 14' and 15' respectively) in the region of a predetermined stop position (I to IX) the lead-less section extending over an angle corresponding to a predetermined stop time.

As a result of this development there is obtained a device of the aforementioned type which is of increased value in use. The transport spindles which extend over the length of the follow-up tool need not interrupt their rotation. Nevertheless, the advantageous result is obtained, due to the lead-less section of the transport spindles at the stop positions, that the workpieces remain for a given period of time in position in order that the corresponding machining can be carried out there. When the lead-less section leaves the region of the workpieces which faces it, further conveyance of the workpieces takes place. The continuous rotation of the transport spindles furthermore results in increased output of the device. Furthermore, the construction of the device can be less expensive since parts that control the stopping and starting of the transport device are dispensed with. It is clear that the threads must be adapted to the workpiece in order for the workpiece to come into the corresponding form-locked position.

One further advantageous development resides in the provision of two transport spindles which are driven in synchronism with each other and extend alongside of each other. This leads to the advantage of a sufficient holding of the workpieces so that canting thereof is avoided. The synchronism also includes the lead-less sections. This means that at the stop positions the corresponding sections of the workpiece lie in the lead-less sections of the transport spindles.

A further advantage is obtained in the manner that a plurality of transport spindles are arranged in succession overlapping each other. This measure makes it possible to machine the middle and end regions of the workpieces. For this purpose the transport spindles are arranged staggered as seen in the axial direction. Therefore the workpiece is in form-locked engagement in the threads of the transport spindles at its ends and at its middle region. This means that with middle form-locked engagement of the workpiece in the threads the end regions of the workpiece can be machined, while in end form-locked position of the workpiece the middle range of the workpiece can be machined.

Furthermore, another advantageous feature is that slide shoes are arranged between two transport spindles which extend alongside each other and rotate synchronously in opposite directions. The ends of the workpiece are in engagement with the threads of the transport spindles which extend with opposite lead. The slide plane of the slide shoes is located a predetermined distance below the plane passing through the transport spindle axes, said distance being approximately equal to the radius of the workpiece. The difference in the direction of lead of the transport spindles permits their rotation in opposite directions. Consequently when the workpieces are transported in the direction of the slide shoes the workpieces are under a load which maintains them in the plane of transport. The driving of the workpieces at their ends enables the end sections as well as the middle region of the workpiece to be extensively machined at a holding position. With an overlapping arrangement of those transport spindles which carry the workpieces along between them and the transport spindles on which the workpieces rest there is present a corresponding difference in height between the pairs of transport spindles.

Finally, it has also been found advantageous to provide a guide ledge for the end of the workpiece alongside of the transport spindles, at least on the side facing the direction of rotation of the transport spindles. The tendency of the workpieces to travel to one side as a result of the direction of rotation of the transport spindles is thereby counteracted.

With the above and other objects and advantages in view, the present invention will become more clearly understood in connection with the detailed description of a preferred embodiment, when considered with the accompanying drawings, of which:

FIG. 1 is a diagrammatic side view of a follow-on tool incorporating one embodiment of the invention, FIG. 2 is a horizontal section through the follow-on tool just above the transport spindles, FIG. 3 is a side view on a larger scale of a transport spindle in the region of a holding position, the transport spindle being in engagement with one end of the workpiece, FIG. 4 is a top view of FIG. 3, FIG. 5 is a cross section through the entrance-side transport spindles, FIG. 6 is a cross section through the transport spindles which overlap the entrance-side transport spindles and FIGS. 7–10 show in elevation and side view selected stages of the workpiece for the manufacture of sewing-machine needles from sewing-machine needle blanks.

The follow-on tool suitable for the manufacture of sewing machine needles has a column frame 1. The frame 1 has a lower stationary plate 2 or rectangular contour. At the corners, columns 3 which are directed upward from the plate 2 serve to guide an upper plate 4 which is connected to a press via clamping pins, not shown.

Between the columns 3 tools 5 are arranged spaced equally one behind the other at positions I to IX (where only positions I–III and VI–IX are shown in FIG. 2). Each tool 5 consists of a lower tool 5' and an upper tool 5" the tools being held in suitable manner on the plates 2 and 4 respectively. The tools 5 are so aligned that they extend parallel to the shorter side of the plates 2, 4.

The workpieces, which are developed in the form of sewing-machine-needle blanks 6, pass through the follow-on tool in the direction indicated by the arrow x. Two pairs P1 and P2 of transport spindles transport the sewing machine needle blanks 6, the pair P1 being arranged on the entrance side.

The pair P1 consists of two transport spindles 7 and 8 which extend alongside of each other and are driven in synchronism with each other. On the entrance end of the transport spindles 7, 8 there are seated toothed cogwheels 9 which are in engagement via an intermediate gear 10. In this way assurance is had that the transport spindles 7, 8 are driven in clockwise direction, as shown in FIG. 5, as seen from the entrance side. In order that the workpiece 6 be moved in the direction of the arrow x with such direction of rotation, the transport spindles 7, 8 are provided with a left-handed trapezoidal thread 11. The central section of the workpiece 6 enters into form-locked engagement with respect to the threads of these transport spindles 7, 8. In order to obtain the stopping of the workpiece at the stop position I, the threaded section is interrupted in the region of the stop position I over an angular region which is adapted to the stop time by a section 11' without lead. As soon as the workpiece reaches this lead-free section 11', no transport of the workpiece accordingly takes place. The lead-free section 11' extends in the present example over an angular region of about 180°.

At the stop position I the machining of the end sections protruding beyond the transport spindles takes place, and sewing machine needle shanks 6' obtained by flat-pressing by the lower tool 5' and the upper tool 5" are produced.

The entrance side transport spindles 7, 8 are followed in overlapping arrangement by the transport spindles 12, 13 forming the pair P2. On their end extending beyond the outlet side of the follow-on tool said spindles bear toothed cogwheels 20 and 21 respectively which are driven in opposite directions to each other by intermediate gears 22, 23. The transport spindle 12 travels in clockwise direction and the transport spindle 13 in counterclockwise direction. In order that the sewing machine needle blanks 6 are moved in the direction indicated by the arrow x, the transport spindle 12 has a left-handed trapezoidal thread and the transport spindle 13 a right-handed trapezoidal thread. The overlapping of the transport spindles 7, 8 and 12, 13 takes place in the region between stop positions I and II. The distance selected between the transport spindles 12 and 13 is somewhat smaller than the length of the sewing machine needle blanks 6. Furthermore the axis of the transport spindles 7, 8 lies lower than the axis of the transport spindles 12, 13 so that the conveyed workpieces 6 lying on the transport spindles 7, 8 come into the radial position with respect to the threads 14, 15 of the transport spindles 12 and 13 respectively. Dependable transfer of the workpieces is assured by a guide ledge 16 which extends parallel to the transport spindle 8. This ledge extends up to the entrance side of the transport spindle 13 in such a manner that the guide surface lies at the height of the diameter of the core of the transport spindle 13. As a result of the direction of rotation of the transport spindles 7, 8 assurance is had that the workpieces are always pressed against the guide ledge 16.

The threaded sections of both transport spindles 12, 13 also have lead-free sections 14' and 15' respectively adapted to the stop time in the region of the stop positions II to IX and therefore at the machining points. This section also extends over a region of 180°, as can be noted in particular from FIGS. 3 and 4. In order that the workpieces 6 which have their ends in engagement with the threads 14, 15 do not come out of their transport plane, slide shoes 17, 18 arranged parallel to each other are provided between the transport spindles 12, 13, the shoes 17, 18 extending between the lower tools 5' of the individual stop positions I to IX. The opposite directions of rotation of the transport spindles 12, 13 assure that the workpieces 6 are pressed against the slide shoes 17, 18 so that no additional securements for the workpieces 6 are required. FIG. 6 shows that the slide plane of the slide shoes 17, 18 passes below the plane extending through the transport spindle axis by an amount equal to the radius y of the workpiece 6.

The tools, which have not been shown individually, are of such a nature that, for instance, the flat pressing of the shank region 6" is effected at the stop position II; cf. FIG. 9. The shank region 6" can possibly be provided there with a hole 6''' which permits the insertion of a positioning pin 19, shown in dash-dot line in FIG. 6.

At position IX the last operation then takes place, so that two finished sewing machine needles N are obtained from the sewing machine needle blank 6 introduced on the entrance side; see FIG. 10.

If a slight lengthening of the workpiece should take place at the stop positions, as a result of the tools 5 this can be counteracted by imparting a greater depth of thread to the transport spindles 12, 13 in the corresponding regions.

Instead of what is shown in the drawing, the transport spindles 12, 13 may also be at a smaller distance from each other. In that case the entrance-side spindles 7, 8 and the transport spindles 12, 13 could be arranged at the same height. However, in such case it is not possible to machine the middle region of the sewing machine needle blanks substantially up to the end between said transport spindles.

We claim:

1. In a device for transporting bar-shaped workpieces, particularly blanks for sewing machine needles, along a transport path in which working of the workpieces occurs, wherein the workpieces are in form-locked engagement with threads of a plurality of transport spindles which extend over the length of the transport path and are transferred from spindle to spindle in the direction of the transport path, wherein over a partial section of the transport path the workpieces engage with their central position in said threads of first said spindles and over another partial section of the transport path the workpieces engage with their end portion in said threads of another of said spindles, wherein the improvement comprises said spindles have central sections containing leadless sections of said threads, said first spindles and said another spindles have respective end sections, the latter extending in overlapping manner relative to each other such that each workpiece is thread-guided during transport in the overlapping end sections of the spindles by engagement of the central portion of the workpieces as well as by engagement of the end portion of the workpieces.

2. The device according to claim 1, wherein
    two of said first spindles are rotatably driven synchronously with respect to each other and extend alongside of each other, the threads of said two first spindles have the same lead.

3. The device according to claim 2, wherein said two first spindles are driven in the same direction of rotation, a guide ledge for guiding one end of the workpieces is provided laterally of the two first spindles facing the direction of rotation of the two first spindles.

4. The device according to claim 1, wherein
the threads of said another spindles include a plurality of said lead-less sections.

5. The device according to claim 1, wherein
said another spindles comprise two second spindles extending alongside of each other, said first spindles project between said two second spindles, said two second spindles are synchronously rotatably driven in opposite directions, said two second spindles have said threads thereof of opposite lead, respectively.

6. The device of claim 5, wherein
the workpiece is engaged as its said end portions in said threads of said two second spindles, slide shoes are arranged between said two second spindles below a plane which is defined by the axes of said two second spindles, and said slide shoes form a slide plane located below said first-mentioned plane substantially by the radius of the workpieces.

7. a device for transporting bar-shaped workpieces between stop positions of a follow-on tool for successive working of the workpieces at said positions comprising a first pair of transport spindles having respective first and second threaded sections arranged for form-locked engagement with a mid-portion of said workpiece, said first and second threaded sections each being interrupted by a respective lead-less section in the region of a predetermined stop position, the lead-less section extending an amount corresponding to a predetermined stop time, and a second pair of transport spindles in sequence with said first pair of transport spindles having end sections overlapping end sections of said first pair of transport spindles and having respective third and fourth threaded sections arranged for form-locked arrangement with opposite end portions of said workpiece, said third and fourth threaded sections each being interrupted by lead-less sections in the region of second predetermined stop positions of the follow-on tool, said overlapping end sections of said first and second pair of transport spindles defining an overlapping region of the spindles and guiding each said workpiece during transport in the overlapping region of the spindles by engagement of the mid-portion of each workpiece as well as by engagement of the opposite end portions of each workpiece.

* * * * *